(12) United States Patent
Odunikan

(10) Patent No.: US 11,278,003 B2
(45) Date of Patent: Mar. 22, 2022

(54) WATER DISPENSER ACTUATING DEVICE

(71) Applicant: Michael Odunikan, San Francisco, CA (US)

(72) Inventor: Michael Odunikan, San Francisco, CA (US)

( * ) Notice: Subject to any disclaimer, the term of this patent is extended or adjusted under 35 U.S.C. 154(b) by 233 days.

(21) Appl. No.: 16/667,285

(22) Filed: Oct. 29, 2019

(65) Prior Publication Data

US 2021/0120781 A1    Apr. 29, 2021

(51) Int. Cl.
*A01K 7/00* (2006.01)
*A01K 7/06* (2006.01)
*A01K 7/02* (2006.01)

(52) U.S. Cl.
CPC .............. *A01K 7/06* (2013.01); *A01K 7/022* (2013.01)

(58) Field of Classification Search
CPC ... A01K 7/06; A01K 7/02; A01K 7/00; A01K 7/022
See application file for complete search history.

(56) References Cited

U.S. PATENT DOCUMENTS

| | | | | |
|---|---|---|---|---|
| 610,707 A * | 9/1898 | Heckaman | ............... | A01K 7/06 |
| | | | | 119/76 |
| 1,212,537 A * | 1/1917 | Millen | .................... | A01K 7/06 |
| | | | | 119/76 |
| 3,272,181 A * | 9/1966 | Ramsey | .................... | A01K 7/06 |
| | | | | 119/76 |
| 4,245,807 A * | 1/1981 | York | ........................ | A01K 7/00 |
| | | | | 248/310 |
| 4,469,049 A | 9/1984 | Waynick | | |
| 4,729,414 A * | 3/1988 | Beber | ....................... | A01K 7/06 |
| | | | | 119/76 |
| 4,924,812 A | 5/1990 | Bernays, Jr. | | |
| 6,279,508 B1 | 8/2001 | Marchant | | |
| 6,526,916 B1 * | 3/2003 | Perlsweig | ................ | A01K 7/06 |
| | | | | 119/74 |
| 7,677,200 B2 * | 3/2010 | Lytle | ......................... | A01K 7/06 |
| | | | | 119/76 |
| 9,353,885 B1 * | 5/2016 | Smith | ....................... | A01K 7/06 |

FOREIGN PATENT DOCUMENTS

WO       WO9322906       11/1993

\* cited by examiner

*Primary Examiner* — Kristen C Hayes

(57) ABSTRACT

A water dispenser actuating device for activating flow of water from a dispenser to a bowl includes an actuator that is configured to be selectively coupled to a water dispenser so that the actuator is operationally coupled to a flow valve of the water dispenser. The actuator is configured to be selectively actuated by at least one of a user and an animal, via application of a downward force to the actuator, to actuate the flow valve so that water flows to a bowl of the water dispenser.

11 Claims, 7 Drawing Sheets

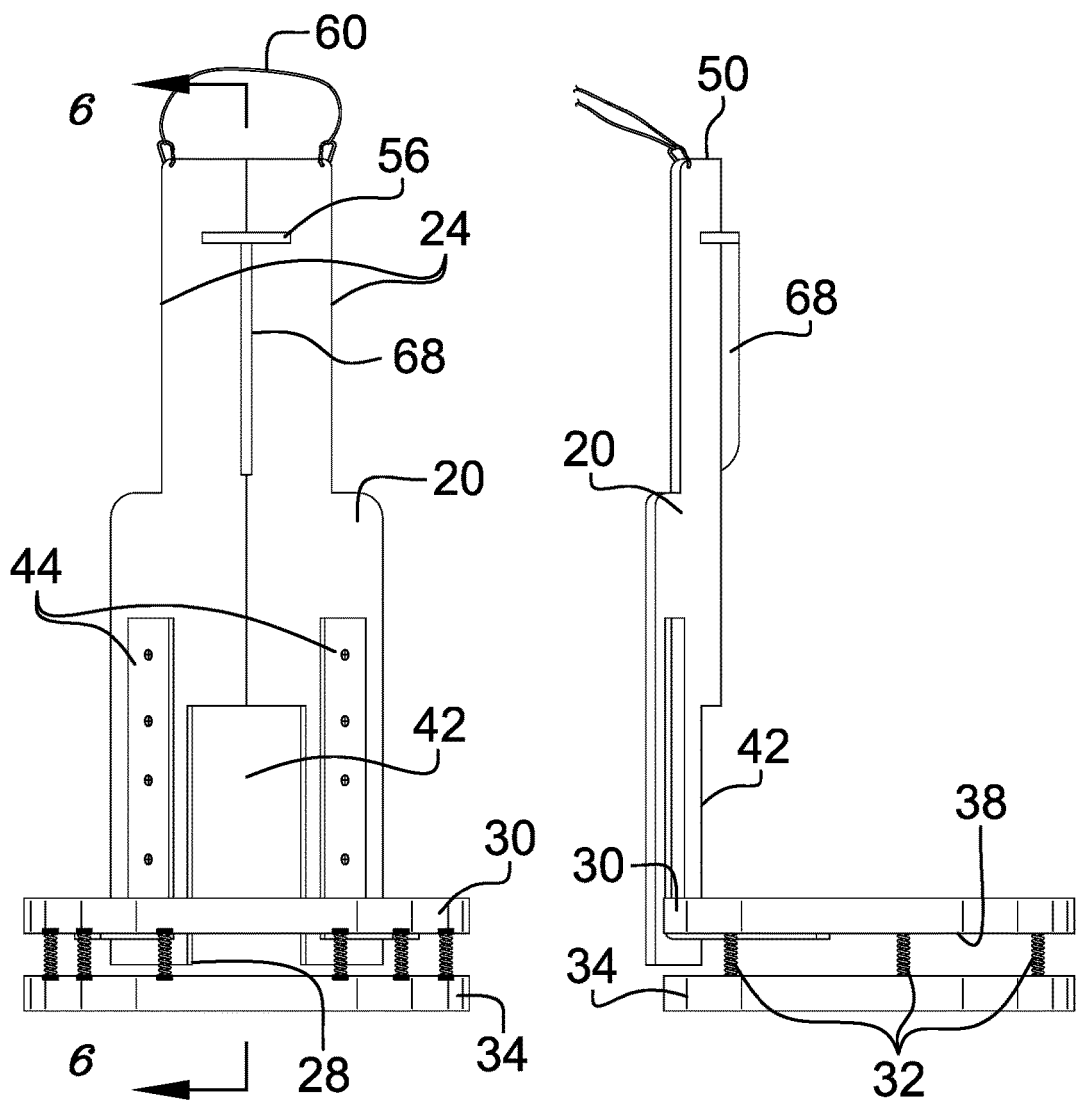
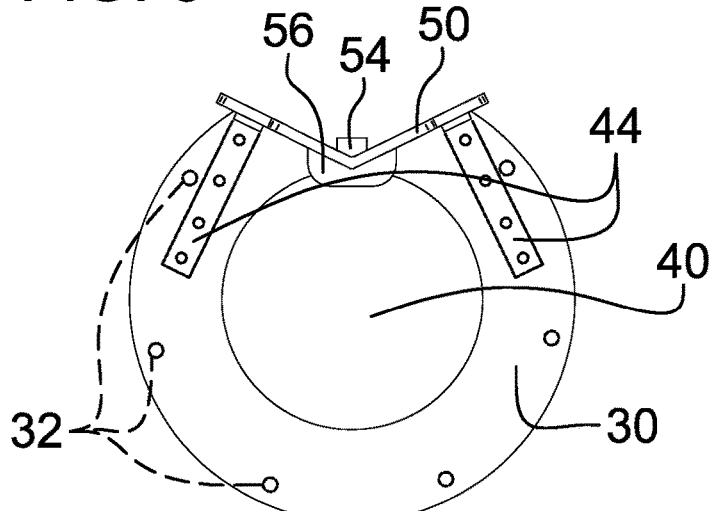
FIG. 3
FIG. 4
FIG. 5

WATER DISPENSER ACTUATING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to actuating devices and more particularly pertains to a new actuating device for activating flow of water from a dispenser to a bowl.

(2) Description of Related Art Including Information Disclosed Under 37 CFR 1.97 and 1.98

The prior art relates to actuating devices.

BRIEF SUMMARY OF THE INVENTION

An embodiment of the disclosure meets the needs presented above by generally comprising an actuator that is configured to be selectively coupled to a water dispenser so that the actuator is operationally coupled to a flow valve of the water dispenser. The actuator is configured to be selectively actuated by at least one of a user and an animal, via application of a downward force to the actuator, to actuate the flow valve so that water flows to a bowl of the water dispenser.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 3 is a front view of an embodiment of the disclosure.

FIG. 4 is a side view of an embodiment of the disclosure.

FIG. 5 is a top view of an embodiment of the disclosure.

DETAILED DESCRIPTION OF THE INVENTION

Figure 1:
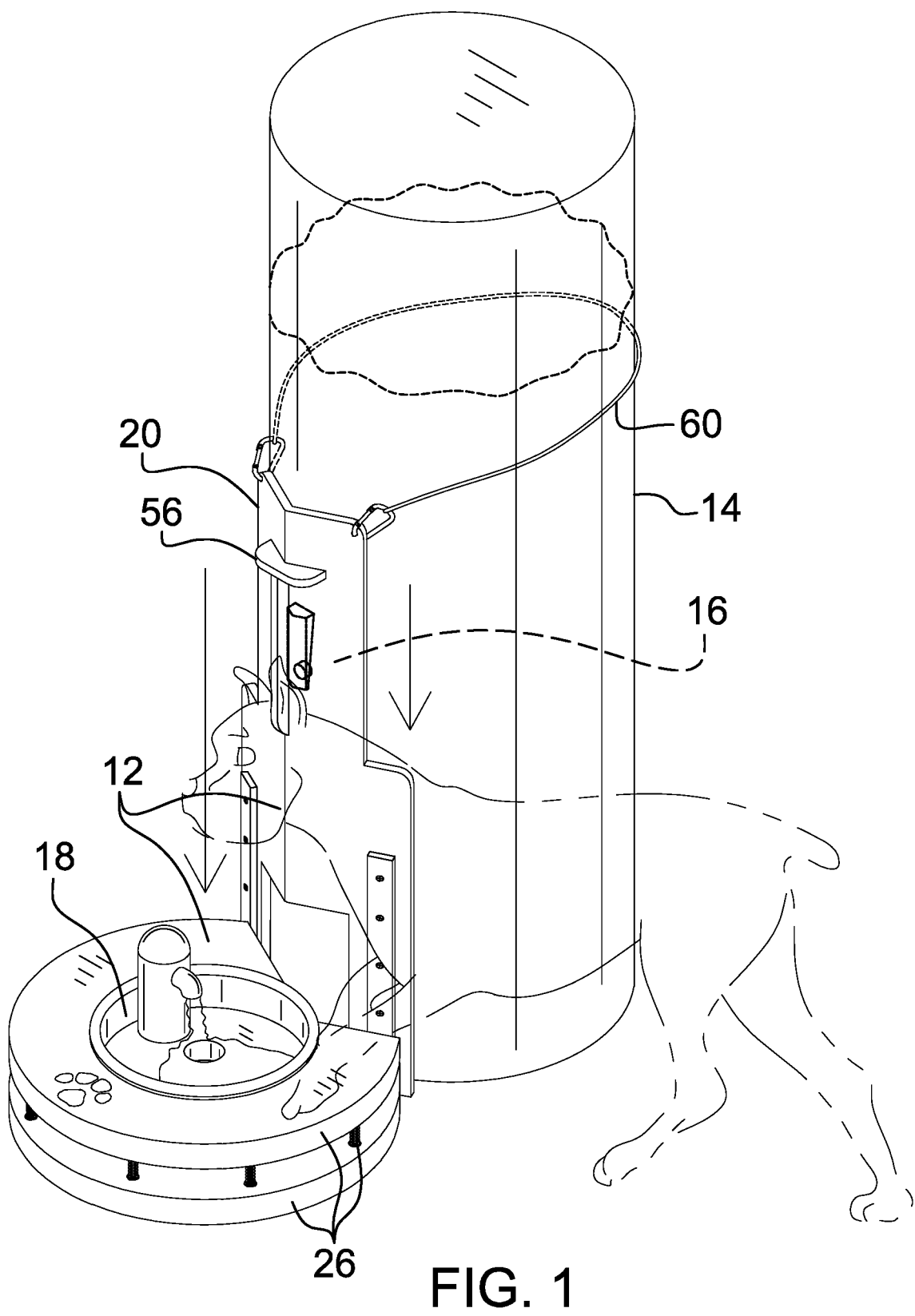
FIG. 1 is an in-use view of a water dispenser actuating device according to an embodiment of the disclosure.

With reference now to the drawings, and in particular to FIGS. 1 through 9 thereof, a new actuating device embodying the principles and concepts of an embodiment of the disclosure and generally designated by the reference numeral 10 will be described.

As best illustrated in FIGS. 1 through 9, the water dispenser actuating device 10 generally comprises an actuator 12 that is configured to be selectively coupled to a water dispenser 14 so that the actuator 12 is operationally coupled to a flow valve 16 of the water dispenser 14. The actuator 12 is configured to be selectively actuated by at least one of a user and an animal, via application of a downward force to the actuator 12, to actuate the flow valve 16 so that water flows to a bowl 18 of the water dispenser 14.

The actuator 12 comprises a plate 20 that is selectively couplable to a vertical element of the water dispenser 14, such as a water tank, as shown in FIG. 1, and a housing for a water fountain (not shown), so that the plate 20 is operationally coupled to the flow valve 16. The plate 20 is contoured so that a centerline 22 of the plate 20 is separated from the vertical element of the water dispenser 14 when opposing edges 24 of the plate 20 are in contact with the vertical element of the water dispenser 14. The plate 20 may be V-shaped when viewed longitudinally, as shown in FIG. 5, or may be alternatively shaped, such as arcuately shaped, C-shaped, and the like, depending on how the vertical element is contoured.

A pedal assembly 26 is coupled to and extends from the plate 20 proximate to a lower end 28 of the plate 20. The pedal assembly 26 is spring loaded and is configured to be selectively depressed by at least one of a foot of the user and a paw of the animal to actuate the flow valve 16 so that water flows to the bowl 18 of the water dispenser 14.

The pedal assembly 26 comprises a first bar 30, a set of springs 32, and a second bar 34. The first bar 30 may be substantially C-shaped, or may be alternatively shaped, such as open-square shaped, and the like, depending on a shape of the bowl 18. The first bar 30 has opposing termini 36 that are coupled to the plate 20 proximate to the lower end 28 of the plate 20 so that the first bar 30 extends substantially perpendicularly from the plate 20.

Each spring 32 is coupled to and extends from a lower face 38 of the first bar 30. The second bar 34, which is shaped substantially complementarily to the first bar 30, is coupled to the set of springs 32 distal from the first bar 30 so that the second bar 34 rests on a surface proximate to the bowl 18 when the bowl 18 is inserted into an opening 40 that is defined by the first bar 30 and the second bar 34.

A cutout 42 extends into the plate 20 from the lower end 28. The cutout 42 is configured to insert elements of the water dispenser 14, such as pipes and tubing that extend between the bowl 18 and the vertical element, as the plate 20 is positioned to be coupled to the vertical element. The cutout 42 also is configured to partially insert the bowl 18 as the pedal assembly 26 is depressed.

Figure 2:
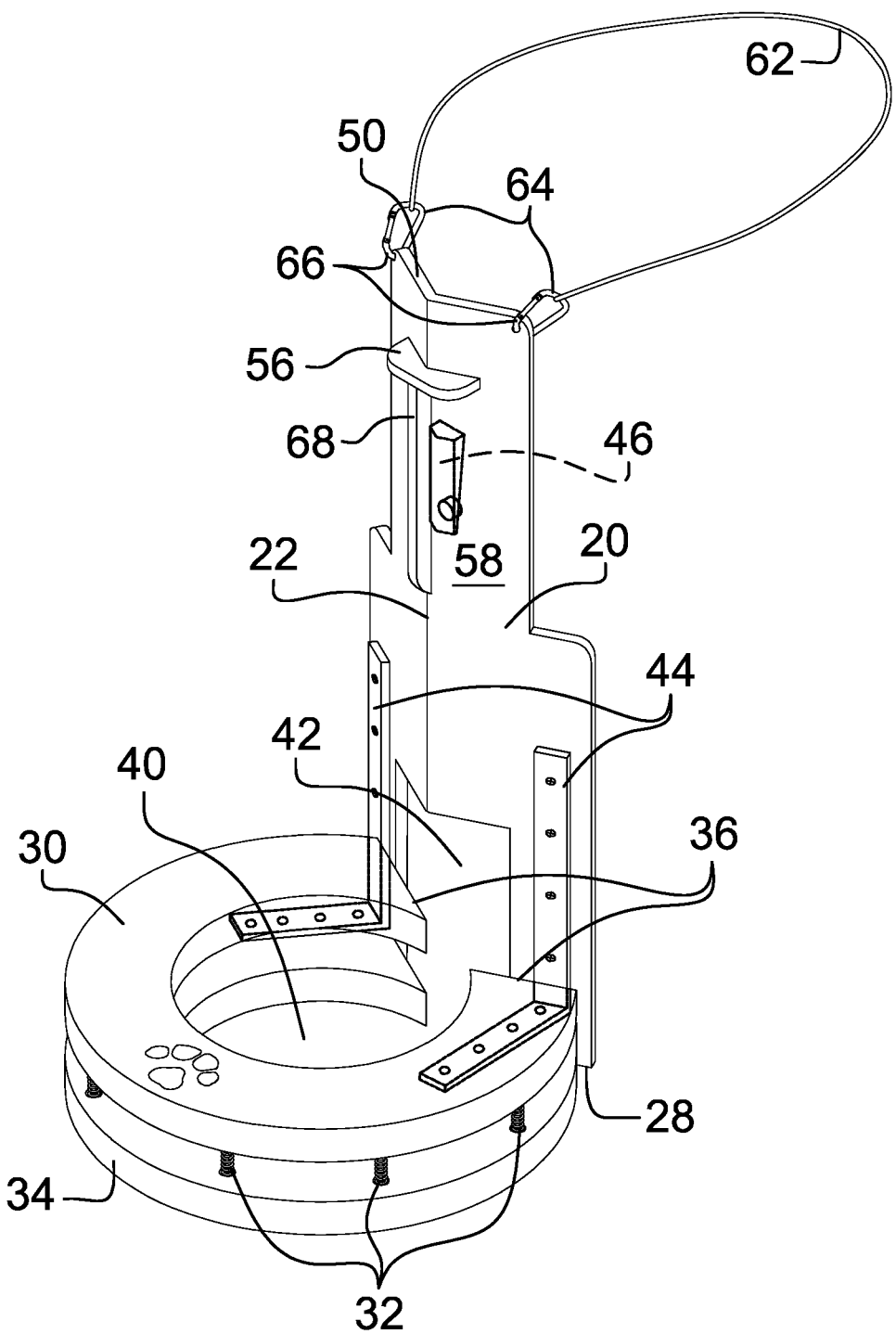
FIG. 2 is an isometric perspective view of an embodiment of the disclosure.

Each of a pair of brackets 44, which are L-shaped, is coupled to and extends between the plate 20 and a respective opposing terminus 36 of the first bar 30, as shown in FIG. 2. The pair of brackets 44 couples the pedal assembly 26 to the plate 20. The present invention anticipates other coupling means for coupling the pedal assembly 26 to the plate 20. Depending on material compositions of the first bar 30 and the plate 20, the coupling means may comprise welds, rivets, bolts, screws, and the like.

Figure 6:
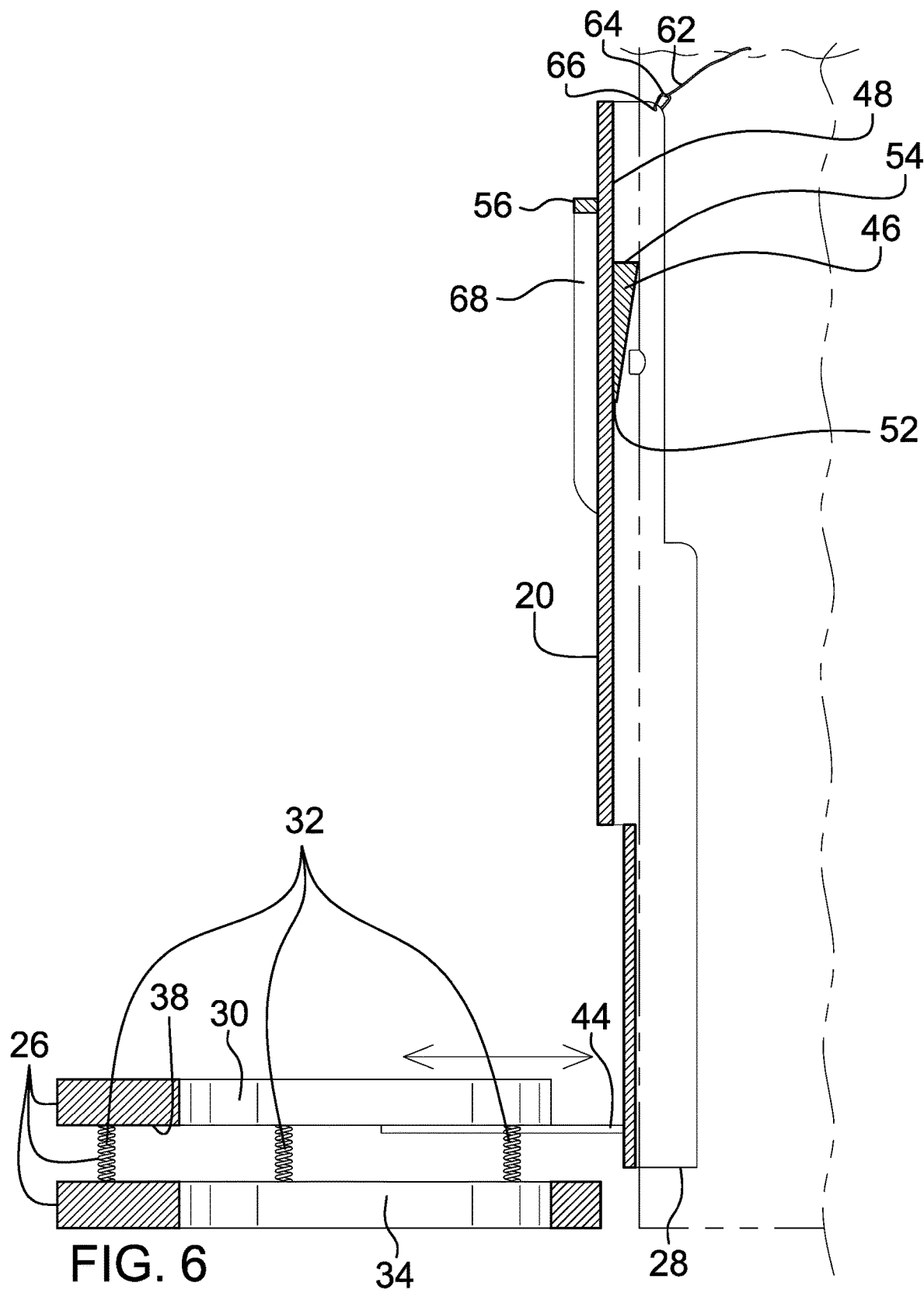
FIG. 6 is a cross-sectional view of an embodiment of the disclosure.
Figure 7:
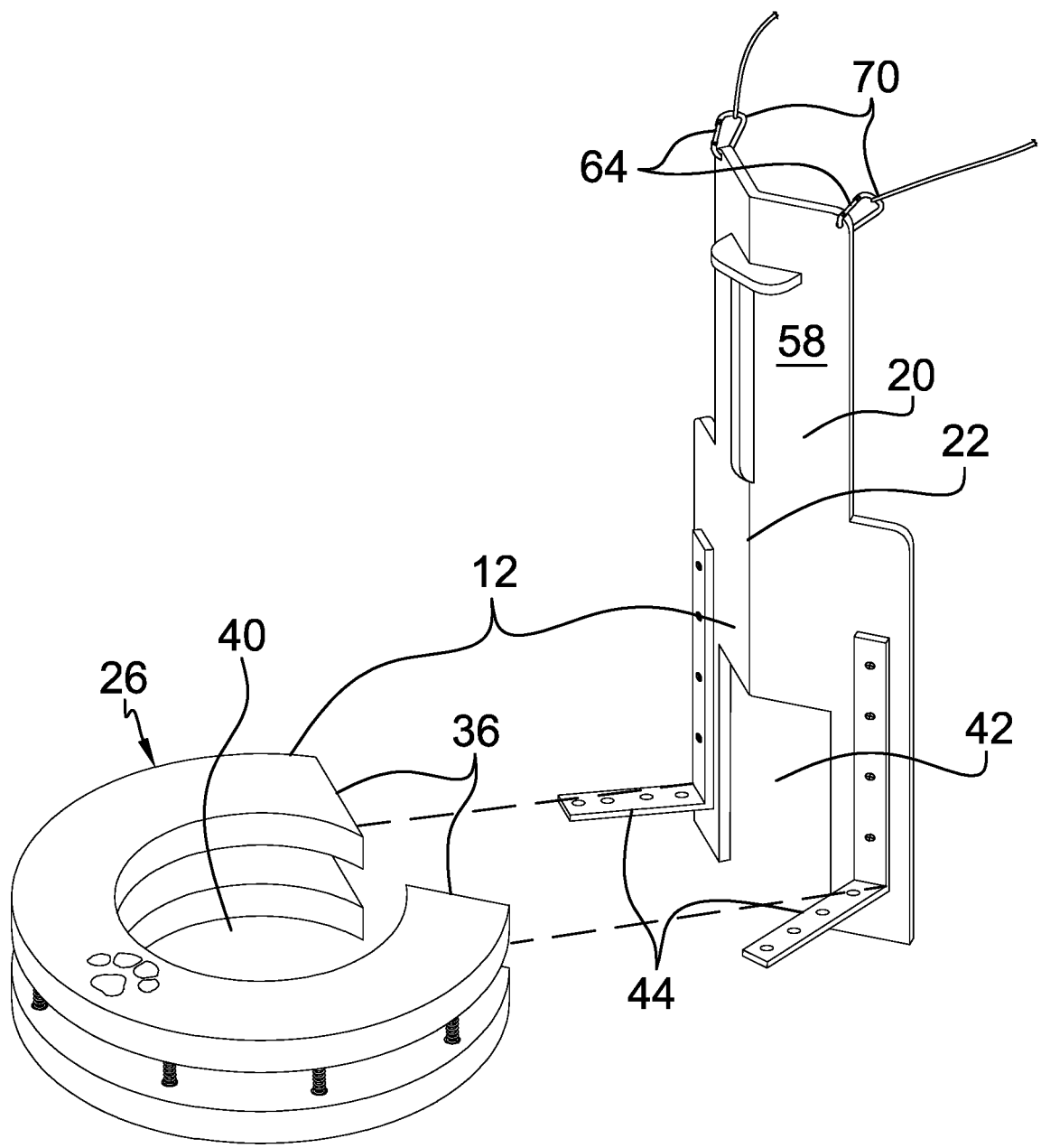
FIG. 7 is an exploded view of an embodiment of the disclosure.
Figure 8:
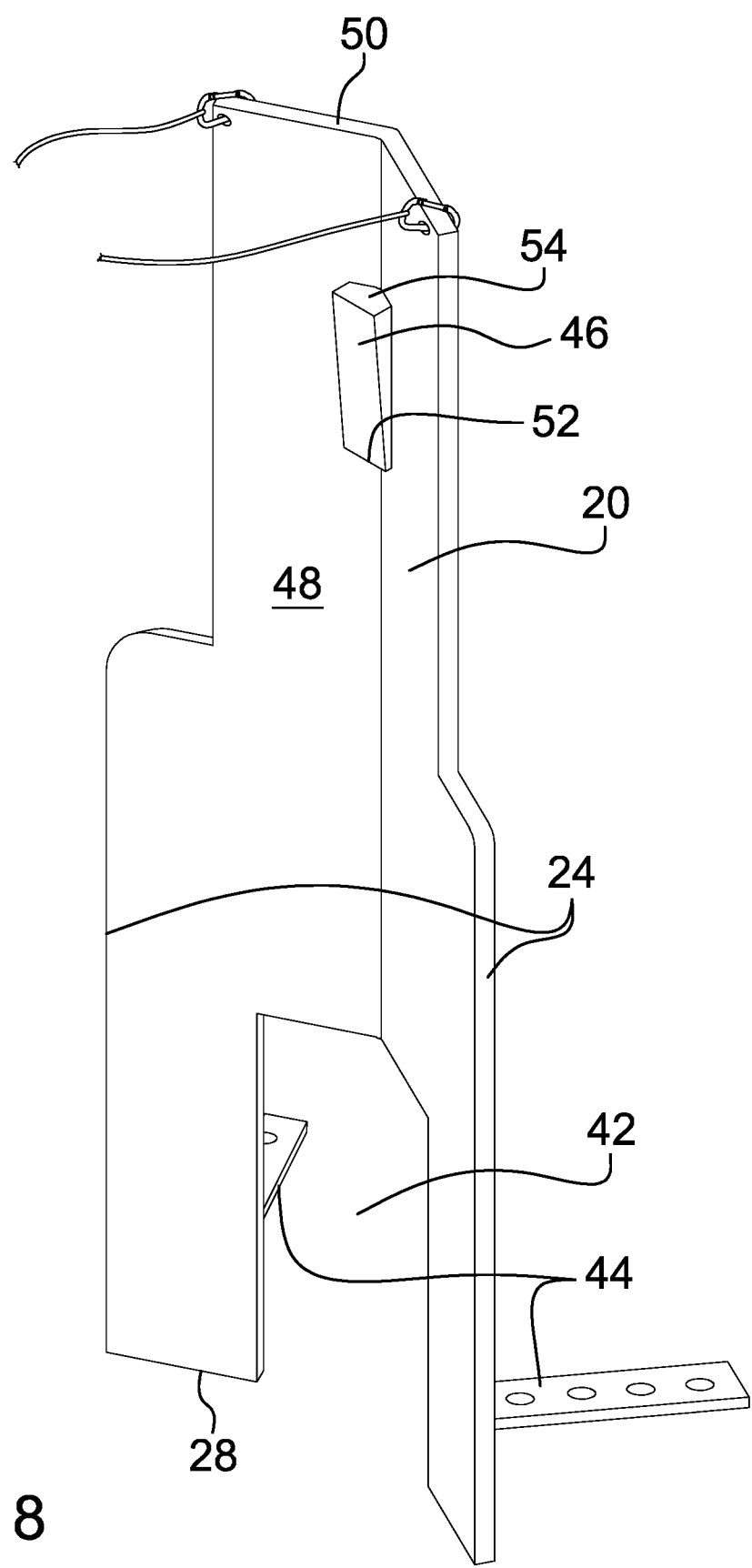
FIG. 8 is an isometric perspective view of an embodiment of the disclosure.
Figure 9:
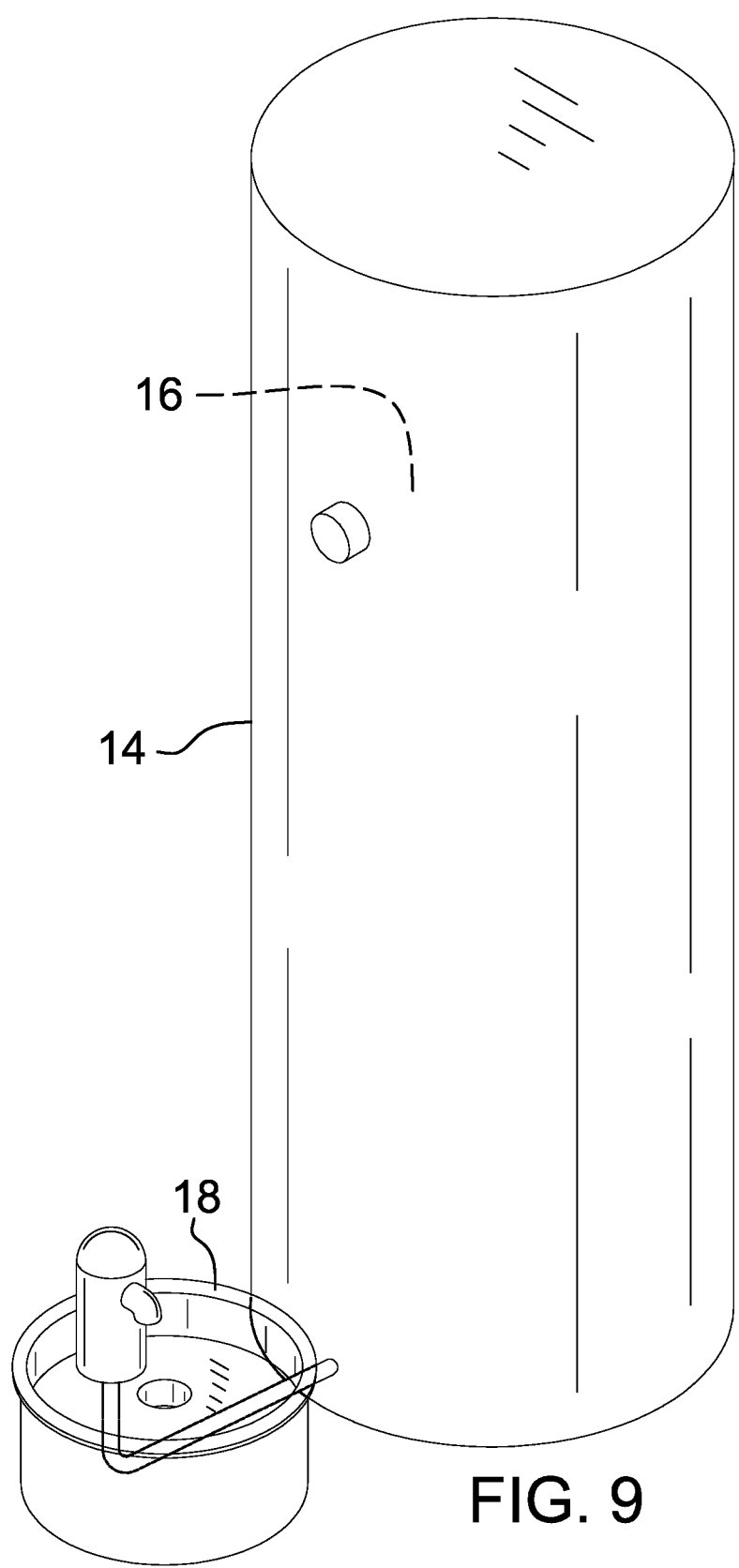
FIG. 9 is a view of a water dispenser of the disclosure.

A wedge 46 is coupled to a back face 48 of the plate 20 proximate to an upper end 50, and substantially equally distant from the opposing edges 24, of the plate 20. A narrow end 52 of the wedge 46 is positioned proximate to a button of the water dispenser 14 when the plate 20 is coupled to the vertical element of the water dispenser 14, as shown in FIG. 6. Button actuated water fountains are commonly found in parks and other public locations. The button is depressed to actuate the flow valve 16 to add water to a bowl 18 that is positioned at a base of the water fountain, but the button can be difficult to operate by a user and is impossible for a pet to manipulate. Depression of the pedal assembly 26 brings a wide end 54 of the wedge 46 into contact with the button, depressing the button to actuate the flow valve 16. The present invention allows either the user or the pet to initiate the flow of water by depressing the pedal assembly 26.

A tab 56 is coupled to and extends from a front face 58 of the plate 20 proximate to the upper end 50. The tab 56 is configured to position a digit of a hand of the user, positioning the user to selectively apply a downward force to the tab 56 to motivate the plate 20 and the wedge 46 to depress the button to actuate the flow valve 16. The tab 56 provides an alternative means of actuating the flow valve 16. A rod 68 that is coupled to and extends from the tab 56 is longitudinally is coupled to the plate 20 so that the rod 68 is positioned to brace the tab 56.

A fastener 60 that is coupled to the actuator 12 is configured to be selectively coupled to the water dispenser 14 so that the fastener 60 is configured to removably couple the actuator 12 to the water dispenser 14. The fastener 60 may comprise a line 62 and a pair of clips 64, or other fastening means, such as, but not limited to, chains, straps, cables, clamps, and the like. The clips 64 are coupled singly to opposing ends 70 of the line 62. One of the clips 64 is selectively insertable into a one of a pair of holes 66 that is positioned in the plate 20 proximate to the upper end 50. The user is positioned to loopedly position the line 62 around the water dispenser 14, positioning the other of the clips 64 to be inserted into the other of the pair of holes 66 to removably couple the plate 20 to the water dispenser 14.

In use, the plate 20 is positioned against the vertical element of the water dispenser 14 with the narrow end 52 of the wedge 46 proximate to the button of the water dispenser 14, concurrently with the bowl 18 being inserted into the opening 40. The fastener 60 is used to secure the plate 20 in place. When it is desired to add water to the bowl 18, either the user and the pet is positioned to push down on the first bar 30, which causes the plate 20 and the wedge 46 to move downwardly so that the wedge 46 depresses the button and actuates the flow valve 16.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A water dispenser actuating device comprising:
   an actuator configured for selectively coupling to a water dispenser such that the actuator is operationally coupled to a flow valve of the water dispenser wherein the actuator is configured for being selectively actuated by at least one of a user and an animal via application of a downward force to the actuator for actuating the flow valve such that water flows to a bowl of the water dispenser; and
   the actuator comprising:
      a plate selectively couplable to a vertical element of the water dispenser such that the plate is operationally coupled to the flow valve; and
      a pedal assembly coupled to and extending from the plate proximate to a lower end of the plate, the pedal assembly being spring loaded wherein the pedal assembly is configured for being selectively depressed by at least one of a foot of the user and a paw of the animal for actuating the flow valve such that water flows to the bowl of the water dispenser.

2. The device of claim 1, further including the plate being contoured such that a centerline of the plate is separated from the vertical element of the water dispenser when opposing edges of the plate are in contact with the vertical element of the water dispenser, the plate being V-shaped when viewed longitudinally.

3. The device of claim 1, further including the pedal assembly comprising:
   a first bar, the first bar being substantially C-shaped, the first bar having opposing termini coupled to the plate proximate to the lower end of the plate such that the first bar extends substantially perpendicularly from the plate;
   a set of springs, each spring being coupled to and extending from a lower face of the first bar; and
   a second bar shaped substantially complementarily to the first bar, the second bar being coupled to the set of springs distal from the first bar such that the second bar rests on a surface proximate to the bowl when the bowl is inserted into an opening defined by the first bar and the second bar.

4. The device of claim 1, further including a cutout extending into the plate from the lower end wherein the cutout is configured for inserting elements of the water dispenser that extend between the bowl and the vertical element as the plate is positioned for coupling to the vertical element and wherein the cutout is configured for partially inserting the bowl as the pedal assembly is depressed.

5. The device of claim 1, further including a pair of brackets, the brackets being L-shaped, each bracket being coupled to and extending between the plate and a respective opposing terminus of the first bar.

6. The device of claim 1, further including a wedge coupled to a back face of the plate proximate to an upper end and substantially equally distant from the opposing edges of the plate such that a narrow end of the wedge is positioned proximate to a button of the water dispenser when the plate is coupled to the vertical element of the water dispenser such that depression of the pedal assembly brings a wide end of the wedge into contact with the button for depressing the button for actuating the flow valve.

7. The device of claim 6, further including a tab coupled to and extending from a front face of the plate proximate to the upper end wherein the tab is configured for positioning a digit of a hand of the user positioning the user for selectively applying a downward force to the tab for motivating the plate and the wedge for depressing the button for actuating the flow valve.

8. The device of claim 7, further including a rod coupled to and extending from the tab, the rod being longitudinally coupled to the plate such that the rod is positioned for bracing the tab.

9. The device of claim 1, further including a line and a pair of clips, the clips being coupled singly to opposing ends of the line such that one of the clips is selectively insertable into a one of a pair of holes positioned in the plate proximate to the upper end positioning the user for loopedly positioning the line around the vertical element of the water dispenser positioning the other of the clips for inserting into the other of the pair of holes for removably coupling the plate to the water dispenser.

10. A water dispenser actuating device comprising:
an actuator configured for selectively coupling to a water dispenser such that the actuator is operationally coupled to a flow valve of the water dispenser wherein the actuator is configured for being selectively actuated by at least one of a user and an animal via application of a downward force to the actuator for actuating the flow valve such that water flows to a bowl of the water dispenser; and
a fastener coupled to the actuator, the fastener being configured for selectively coupling to the water dispenser wherein the fastener is configured for removably coupling the actuator to the water dispenser.

11. A water dispenser actuating device comprising:
an actuator configured for selectively coupling to a water dispenser such that the actuator is operationally coupled to a flow valve of the water dispenser wherein the actuator is configured for being selectively actuated by at least one of a user and an animal via application of a downward force to the actuator for actuating the flow valve such that water flows to a bowl of the water dispenser, the actuator comprising:

a plate selectively couplable to a vertical element of the water dispenser such that the plate is operationally coupled to the flow valve, the plate being contoured such that a centerline of the plate is separated from the vertical element of the water dispenser when opposing edges of the plate are in contact with the vertical element of the water dispenser, the plate being V-shaped when viewed longitudinally,
a pedal assembly coupled to and extending from the plate proximate to a lower end of the plate, the pedal assembly being spring loaded wherein the pedal assembly is configured for being selectively depressed by at least one of a foot of the user and a paw of the animal for actuating the flow valve such that water flows to the bowl of the water dispenser, the pedal assembly comprising:
a first bar, the first bar being substantially C-shaped, the first bar having opposing termini coupled to the plate proximate to the lower end of the plate such that the first bar extends substantially perpendicularly from the plate,
a set of springs, each spring being coupled to and extending from a lower face of the first bar, and
a second bar shaped substantially complementarily to the first bar, the second bar being coupled to the set of springs distal from the first bar such that the second bar rests on a surface proximate to the bowl when the bowl is inserted into an opening defined by the first bar and the second bar,
a cutout extending into the plate from the lower end wherein the cutout is configured for inserting elements of the water dispenser that extend between the bowl and the vertical element as the plate is positioned for coupling to the vertical element and wherein the cutout is configured for partially inserting the bowl as the pedal assembly is depressed,
a pair of brackets, the brackets being L-shaped, each bracket being coupled to and extending between the plate and a respective opposing terminus of the first bar,
a wedge coupled to a back face of the plate proximate to an upper end and substantially equally distant from the opposing edges of the plate such that a narrow end of the wedge is positioned proximate to a button of the water dispenser when the plate is coupled to the vertical element of the water dispenser such that depression of the pedal assembly brings a wide end of the wedge into contact with the button for depressing the button for actuating the flow valve,
a tab coupled to and extending from a front face of the plate proximate to the upper end wherein the tab is configured for positioning a digit of a hand of the user positioning the user for selectively applying a downward force to the tab for motivating the plate and the wedge for depressing the button for actuating the flow valve, and
a rod coupled to and extending from the tab, the rod being longitudinally coupled to the plate such that the rod is positioned for bracing the tab; and
a fastener coupled to the actuator, the fastener being configured for selectively coupling to the water dispenser wherein the fastener is configured for removably coupling the actuator to the water dispenser, the fastener comprising a line and a pair of clips, the clips being coupled singly to opposing ends of the line such that one of the clips is selectively insertable into a one of a pair of holes positioned in the plate proximate to the upper end positioning the user for loopedly positioning the line around the water dispenser positioning the other of the clips for inserting into the other of the pair of holes for removably coupling the plate to the water dispenser.

* * * * *